United States Patent
Mai

(10) Patent No.: US 10,192,314 B2
(45) Date of Patent: Jan. 29, 2019

(54) METHOD, SYSTEM AND APPARATUS FOR DETERMINING A LOWEST POINT OF A TARGET OBJECT IN AN IMAGE

(71) Applicant: CANON KABUSHIKI KAISHA, Tokyo (JP)

(72) Inventor: Fei Mai, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 15/379,312

(22) Filed: Dec. 14, 2016

(65) Prior Publication Data

US 2018/0165813 A1     Jun. 14, 2018

(51) Int. Cl.
*G06T 7/11*     (2017.01)
*G06K 9/00*     (2006.01)

(52) U.S. Cl.
CPC .......... *G06T 7/11* (2017.01); *G06K 9/00369* (2013.01); *G06K 9/00771* (2013.01)

(58) Field of Classification Search
None
See application file for complete search history.

(56) References Cited

U.S. PATENT DOCUMENTS

| 8,045,759 B2* | 10/2011 | Mizutani | G06K 9/00362 382/103 |
| 2004/0264806 A1* | 12/2004 | Herley | G06T 5/50 382/284 |
| 2013/0051662 A1* | 2/2013 | Shiozaki | G06K 9/00228 382/159 |
| 2014/0347475 A1* | 11/2014 | Divakaran | G06K 9/00771 348/135 |

OTHER PUBLICATIONS

Pedro F. Felzenszwalb, Ross B. Girshick, David Mcallester and Deva Ramanan. "Object Detection with Discriminatively Trained Part-based Models." IEEE transactions on pattern analysis and machine intelligence 32, No. 9 (2010) 1627-1645.

Fengjun LV, Tao Zhao, and Ramakant Nevatia. "Self-calibration of a Camera from Video of a Walking Human." In Pattern Recognition, (2002). Proceedings. 16th International Conference on, vol. 1, pp. 562-567. IEEE, 2002.

Sitapa Rujjkietgumjorn, Robert T. Collins. "Optimized Pedestrian Detection for Multiple and Occluded People." In Proceedings of the IEEE Conference on Computer Vision and Pattern Recognition, pp. 3690-3697. (2013).

(Continued)

*Primary Examiner* — Delomia L Gilliard
(74) *Attorney, Agent, or Firm* — Canon USA Inc., IP Division

(57) ABSTRACT

A method of determining a lowest point of a target object in an image of a scene. A region of the target object in the image is received. A horizontal vanishing line of the image is received. At least one reference object in the scene is selected. At least a first line connecting the received region of the target object and a highest point of the reference object is determined. At least an intersection point of the first line and the horizontal vanishing line is determined. At least a second line connecting the determined intersection point to a lowest point of the reference object is determined; and a lowest point of the target object is determined based on the second line.

20 Claims, 12 Drawing Sheets

(56) References Cited

OTHER PUBLICATIONS

Xiaoyu Wang, Tony X. Han, and Shuicheng Yan. "An HOG-LBP human detector with partial occlusion handling." IEEE 12th International Conference on Computer Vision, pp. 32-39. IEEE, (2009).
Richard Hartley and Andrew Zisserman, "Multiple View Geometry in Computer Vision", 2nd Ed, Cambridge University Press, (Mar. 2004), pp. 208-233.
"Histogram of Oriented Gradients." https://en.wikipedia.org/wiki/Histogram_of oriented_gradients, (last modified on Nov. 28, 2016), pp. 1-6.
"Linear Least Squares." https://en.wikipedia.org/wiki/Linear_least_squares, (last modified on Nov. 18, 2016), p. 1.
"Aspect Ratios of Simple Shapes." https://en.wikipedia.org/wiki/Aspect_ratio, (last modified on Oct. 8, 2016), pp. 1-3.
"Background Subtraction," https://en.wikipedia.org/wiki/Background_substraction, (last modified on Dec. 7, 2016), pp. 1-8.
"Image Segmentation," https://en.wikipedia.org/wiki/Image_segmentation, (last modified on Dec. 9, 2016), pp. 1-16.
Rodrigo Benenson, Mohamed Omran, Jan Hosang, Bernt Schiele, "Ten Years of Pedestrian Detection, What Have We Learned?" Max Planck Institut for Informatics, Saarrucken, Germany, 2014, p. 1-14, Supplementary Material pp. 1-3.
"Recursive Bayesian Estimation," https://en.wikipedia.org/wiki/Recursive_Bayesian_Estimation, (last modified on Nov. 18, 2016), pp. 1-3.

* cited by examiner

METHOD, SYSTEM AND APPARATUS FOR DETERMINING A LOWEST POINT OF A TARGET OBJECT IN AN IMAGE

TECHNICAL FIELD

The present description relates generally to image processing and, in particular, to a method, system and apparatus for determining a lowest point of a target object, such as a person, in an image of a scene. The present description also relates to a computer program product including a computer readable medium having recorded thereon a computer program for determining a lowest point of a target object in an image of a scene.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view any video feed containing a particular suspicious person in order to identify undesirable activities. In another example from the business analytics domain, a shopping centre may wish to track customers across multiple cameras in order to build a profile of shopping habits. The aforementioned surveillance applications typically require persons to be detected, tracked, matched and analysed across multiple camera views even when the persons are partially occluded by other persons or objects in a scene. This is especially true when tracking persons in crowded scenes such as shopping malls, train stations etc. Tracking a person in a crowded scene requires robust detection of the person in the presence of occlusions.

One method of detecting a target object in an image detects objects using part based models. The part based model method uses a mixture of multi-scale deformable part models. For example, a part model may refer to a model of a part of the human body for detecting objects. However, there is a high computational load associated with the method since an occluded person in the scene needs to be matched against a potentially large number of part models to obtain a matching score. Further, the part based model method can still fail in the presence of severe occlusions.

Another method of detecting a target object in an image of a scene uses a calibrated camera and specifies a width for a person to be detected. Assuming that the feet of the person is visible in the image, the width and height of a bounding box enclosing a person can be determined iteratively by evaluating symmetry within the bounding box. However, the calibrated camera method fails when the feet of the person are not observable or if the presence of occlusions affects the symmetry within the bounding box.

Another method of detecting a target object in an image use training data to learn the size of a bounding box enclosing a person in the scene. Assuming a foreground mask is available for the scene representing foreground objects (e.g. moving persons), an objective function is used to maximise a trade-off between unary confidence scores and pairwise overlap penalties. However, this training data method requires a large amount of training data to learn the bounding box size to a high degree of accuracy. Despite this training date method is not robust to severe occlusions.

A camera may be calibrated from a vertical vanishing point and a horizon line. One method of estimating a vertical vanishing point is to track a moving person in a scene. However, the persons tracked in the scene to obtain a vertical vanishing point must be fully visible in the scene, or in other words completely unoccluded.

SUMMARY

It is an object of the present invention to substantially overcome, or at least ameliorate, one or more disadvantages of existing arrangements.

Disclosed are arrangements, referred to as Target Detection with Geometric Constraints (TDGC) arrangements, which seek to address the above problems by determining a full body bounding box enclosing a target person by imposing geometric constraints.

According to one aspect of the present disclosure, there is provided a method of determining a lowest point of a target object in an image of a scene, said method comprising: receiving a region of the target object in the image; receiving a horizontal vanishing line of the image; selecting at least one reference object in the scene; determining at least a first line connecting the received region of the target object and a highest point of the reference object; determining at least an intersection point of the first line and the horizontal vanishing line; determining at least a second line connecting the determined intersection point to a lowest point of the reference object; and determining a lowest point of the target object based on the second line.

According to another aspect of the present disclosure, there is provided a system for determining a lowest point of a target object in an image of a scene, said system comprising: a memory for storing data and a computer program; a processor coupled to the memory for executing the computer program, said computer program comprising instructions for: receiving a region of the target object in the image; receiving a horizontal vanishing line of the image; selecting at least one reference object in the scene; determining at least a first line connecting the received region of the target object and a highest point of the reference object; determining at least an intersection point of the first line and the horizontal vanishing line; determining at least a second line connecting the determined intersection point to a lowest point of the reference object; and determining a lowest point of the target object based on the second line.

According to still another aspect of the present disclosure, there is provided an apparatus for determining a lowest point of a target object in an image of a scene, said apparatus comprising: units for receiving a region of the target object in the image; units for receiving a horizontal vanishing line of the image; units for selecting at least one reference object in the scene; units for determining at least a first line connecting the received region of the target object and a highest point of the reference object; units for determining at least an intersection point of the first line and the horizontal vanishing line; units for determining at least a second line connecting the determined intersection point to a lowest point of the reference object; and units for determining a lowest point of the target object based on the second line.

According to another aspect of the present disclosure, there is provided a non-transitory computer readable medium having a computer program stored on the medium for determining a lowest point of a target object in an image of a scene, said program comprising: code for receiving a region of the target object in the image; code for receiving a horizontal vanishing line of the image; code for selecting at least one reference object in the scene; code for determining at least a first line connecting the received region of the target object and a highest point of the reference object; code for determining at least an intersection point of the first line and the horizontal vanishing line; code for determining at least a second line connecting the determined intersection point to a lowest point of the reference object; and code for determining a lowest point of the target object based on the second line.

According to another aspect of the present disclosure, there is provided a method of detecting a target object in an image of a scene, said method comprising: receiving a head region of the target object in the image; receiving a horizontal vanishing line of the image; selecting at least a reference object in the scene; determining at least a first line connecting the head region and a top of the reference object; determining at least an intersection of the first line and the horizontal vanishing line; determining at least a second line connecting the intersection to a bottom position of the reference object; determining lowest point of the target object based on the second line; and forming a bounding box of the target object to detect the target object, the bounding box being based on the head region and the point of the target person.

According to another aspect of the present disclosure, there is provided A system for detecting a target object in an image of a scene, said system comprising: a memory for storing data and a computer program; a processor coupled to the memory for executing the computer program, said computer program comprising instructions for: receiving a head region of the target object in the image; receiving a horizontal vanishing line of the image; selecting at least a reference object in the scene; determining at least a first line connecting the head region and a top of the reference object; determining at least an intersection of the first line and the horizontal vanishing line; determining at least a second line connecting the intersection to a bottom position of the reference object; determining lowest point of the target object based on the second line; and forming a bounding box of the target object to detect the target object, the bounding box being based on the head region and the point of the target person.

According to another aspect of the present disclosure, there is provided an apparatus for detecting a target object in an image of a scene, said apparatus comprising: units for receiving a head region of the target object in the image; units for receiving a horizontal vanishing line of the image; units for selecting at least a reference object in the scene; units for determining at least a first line connecting the head region and a top of the reference object; units for determining at least an intersection of the first line and the horizontal vanishing line; units for determining at least a second line connecting the intersection to a bottom position of the reference object; units for determining lowest point of the target object based on the second line; and units for forming a bounding box of the target object to detect the target object, the bounding box being based on the head region and the point of the target person.

According to another aspect of the present disclosure, there is provided a non-transitory computer readable medium having a computer program stored on the medium for detecting a target object in an image of a scene, said program comprising: code for receiving a head region of the target object in the image; code for receiving a horizontal vanishing line of the image; code for selecting at least a reference object in the scene; code for determining at least a first line connecting the head region and a top of the reference object; code for determining at least an intersection of the first line and the horizontal vanishing line; code for determining at least a second line connecting the intersection to a bottom position of the reference object; code for determining lowest point of the target object based on the second line; and code for forming a bounding box of the target object to detect the target object, the bounding box being based on the head region and the point of the target person.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
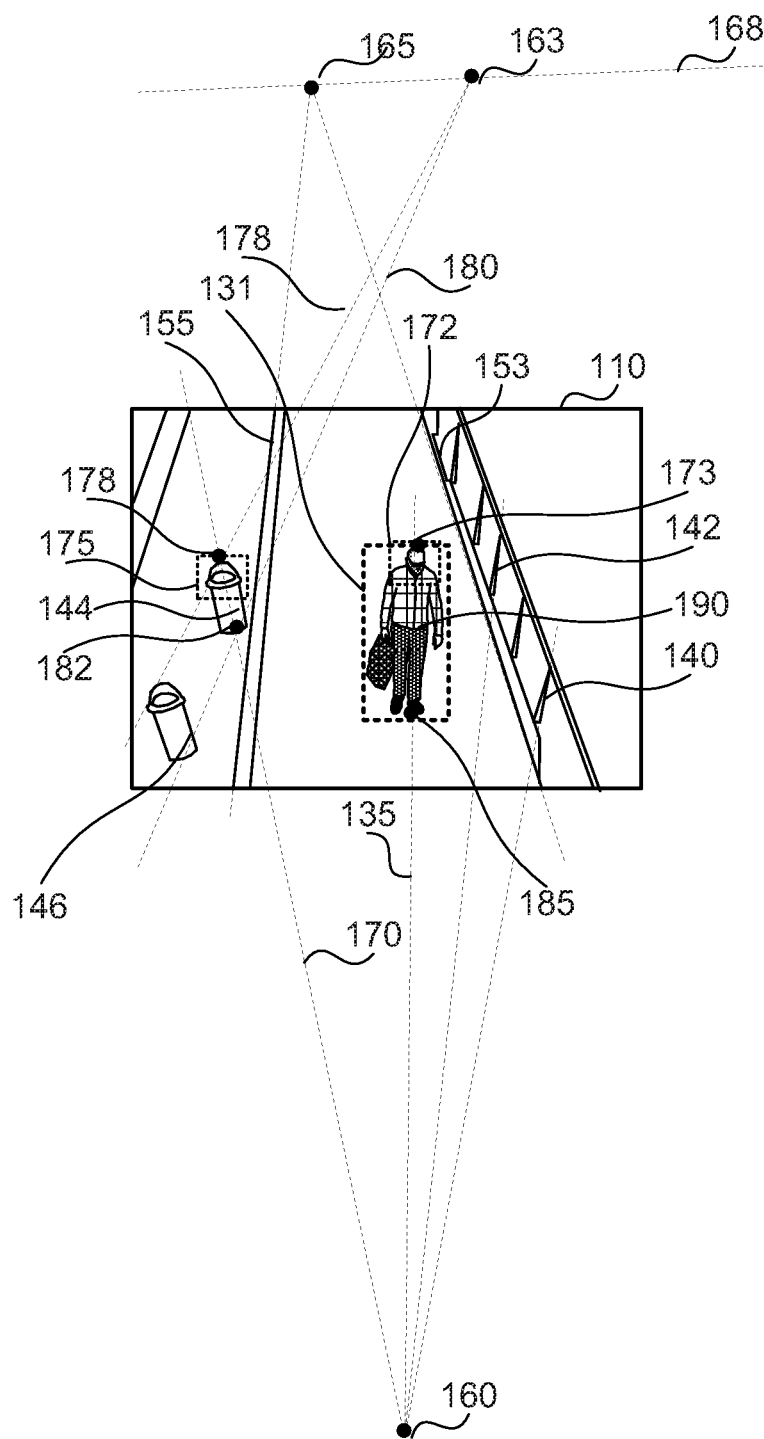
FIG. 1A shows an image of an object of interest captured by a first digital camera.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

While the examples in the following description mostly relate to identifying a person of interest, the method in the present disclosure may equally be practised on other types of objects.

An image, such as the image 110, is made up of visual elements. The terms "pixel", "pixel location" and "image location" each refer to one of the visual elements in a captured image. Each pixel of an image is described by one or more values characterising a property of the scene captured in the image. In one example, a single intensity value characterises the brightness of the scene at the pixel location. In another example, a triplet of values characterise the colour of the scene at the pixel location. Furthermore, a "region" or "image region" in an image refers to a collection of one or more spatially adjacent visual elements.

A "feature" or "appearance descriptor" represents a derived value or set of derived values determined from the pixel values in an image region. In one example, a descriptor includes a histogram of colour values in the image region. In another example, a descriptor includes a histogram of quantized image gradient responses in a region.

The term "edge" refers to the boundary between two different regions in a scene. An edge and a point are said to be "collinear" if the edge and the point lie on the same line. It is a property of camera geometry that the image of a set of parallel edges in a scene are collinear with a single point in the image, known as a "vanishing point". A "horizontal plane" in a scene is a plane which is perpendicular to the vertical direction. A "horizontal vanishing point" is a vanishing point collinear with the images of a set of parallel edges parallel to a horizontal plane in the scene. In one example, with reference to FIG. 1A, where the ground floor is flat and horizontal lines 153 and 155 align with two parallel edges parallel to a horizontal ground plane in a first image 110, and are collinear with the horizontal vanishing point 165. Another example of horizontal vanishing point is point 163, which is collinear with lines 178 and 180. Line 178 connects highest points of two identical rubbish bins 144 and 146. Line 180 connects lowest points of two identical rubbish bins 144 and 146. Since 144 and 146 are identical rubbish bins, lines 178 and 180 are parallel lines in the scene which are also parallel to the horizontal ground plane. Therefore, point 163 is a horizontal vanishing point. All "horizontal vanishing points" are collinear with a line, known as a "horizontal vanishing line". In one example, horizontal vanishing points 165 and 163 are collinear with the horizontal vanishing line 168.

A "vertical vanishing point" is a vanishing point collinear with the image of all vertical edges in the scene. In one example, lines 140 and 142 align with vertical edges in a first image 110 and are collinear with the vertical vanishing point 160. A "vertical axis" of an object is a line that is parallel to the vertical direction in a scene and passes through the centre of the object. It is a property of camera geometry that the image of a vertical axis of an object in a scene is collinear with the vertical vanishing point. In one example, the vertical axis 135 of the object 190 in the image 110 is collinear with the vertical vanishing point 160. In another example, the vertical axis 170 of the object 144 in the image 110 is collinear with the vertical vanishing point 160.

A "bounding box" is a rectangular box that fully encloses a target object in an image. In one example, the rectangular box 131 is the bounding box for person 190. In another example, the rectangular box 172 is the bounding box for the head of person 190.

A "head region" of a target object refers to a collection of one or more spatially adjacent visual elements located at the top of the target object. In one example, with reference to FIG. 1A, bounding box 172 shows the head region of person 190. In another example, bounding box 175 shows the head region of a rubbish bin 144. A "head top" of a target object refers to a highest point in the head region along the vertical axis. A "feet bottom" of a target object refers to a lowest point on the target object along the vertical axis. In one example, point 173 is the head top of person 190. Point 173 may be referred to as a highest point of the person 190. Further, point 185 is the feet bottom of person 190. Point 185 may be referred to as a lowest point of the person 190. In another example, point 178 is the head top (or highest point) of a rubbish bin 144, and point 182 is the feet bottom (or lowest point) of a rubbish bin 144.

The term "occlusion" and "partial occlusion" are used interchangeably throughout this specification to refer to the case where the target object of interest is partially occluded by another object. In one example, the person 133 in image 120 is partially occluded by another person 132. In another example, the person 130 in image 120 is partially occluded by a pole.

Figure 4:
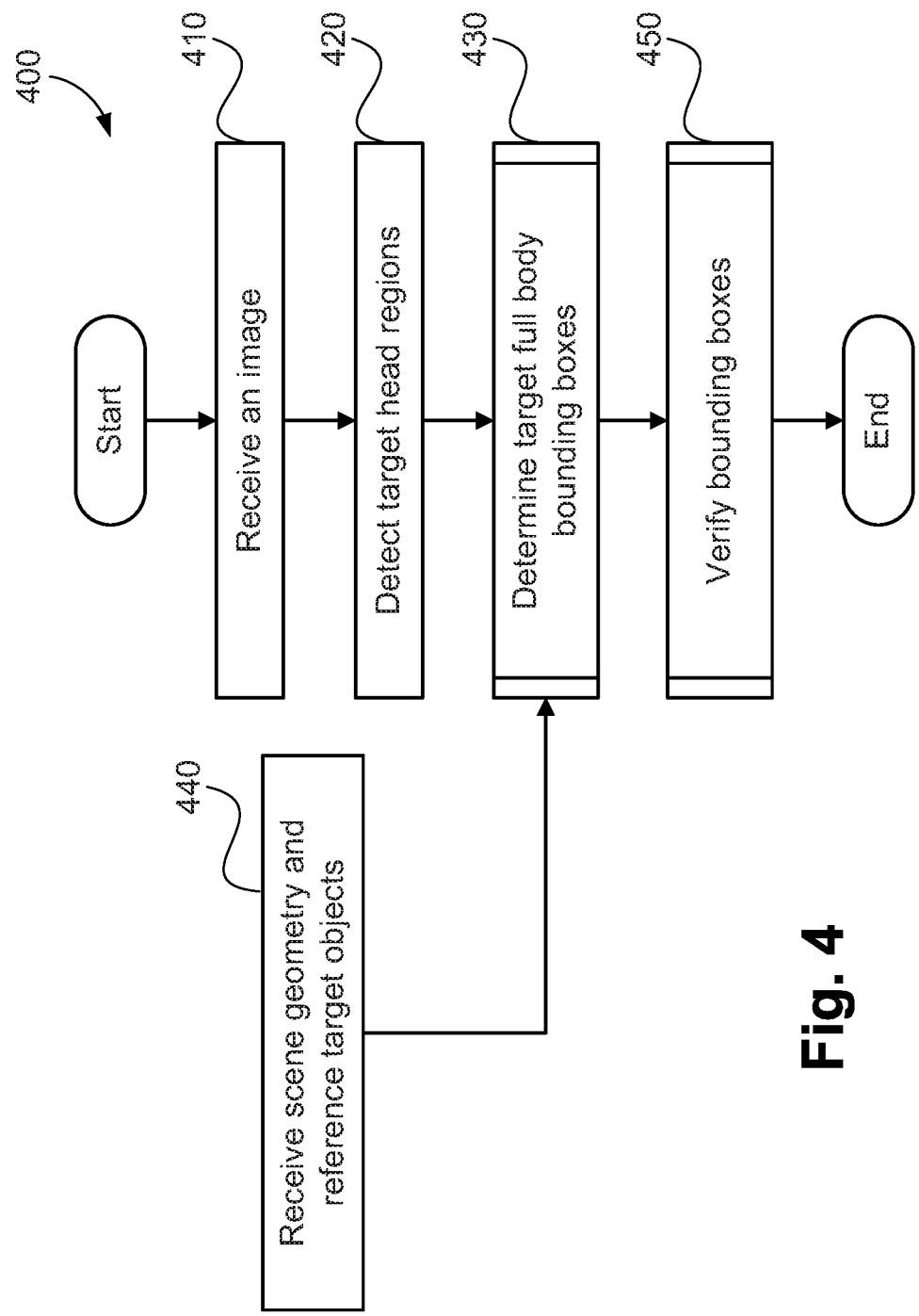
FIG. 4 is a schematic flow diagram showing a method of detecting a target object in an image of a scene.

A method 400 of detecting a target object, such as a person, in an image of a scene, is described below with reference to FIG. 4. The method 400 determines the full body of a target object by imposing geometric constraints. The method 400 may be referred to as a "target detection with geometric constraints (TDGC)" method. As described in detail below, the lowest point of the target object is determined for use in detecting the target object. The method 400 is able to detect a target object which is partially occluded. The method 400 can be applied to cases where part of the target object of interest is camouflaged.

Figure 1B:
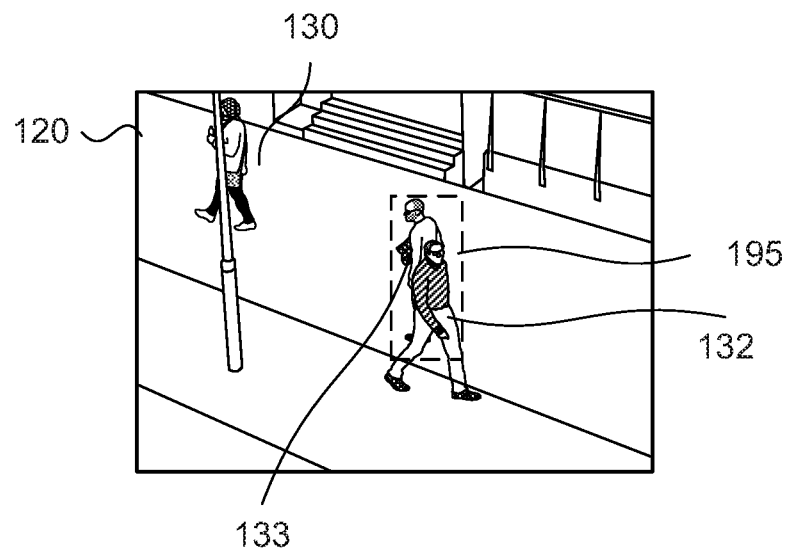
FIG. 1B shows an image of a candidate object captured by a second digital camera.

An example use case to which the method 400 may be applied will now be described with reference to FIGS. 1A and 1B. In the example of FIGS. 1A and 1B, the method 400 may be used to determine whether a first object 131 observed in an image 110 of a first scene captured by a first digital camera 115 has the same identity as a second object 133 detected in an image 120 of a second scene captured by a second digital camera 125. The cameras 115 and 125 are connected to a computer system 150 to which TDGC arrangements may be applied. TDGC may equally be applied when images are captured by different cameras simultaneously or at different times, or captured by the same camera at different times, including images that represent the same scene or different scenes.

In the example of FIGS. 1A and 1B, a person detection is applied to the first image 110 and the second image 120 to detect the bounding box 131 for person 190 and bounding box 195 for person 133. A first appearance descriptor for the first object is extracted from an image region 131, and a second appearance descriptor for the second person is extracted from an image region 195. A similarity score is determined based on the first and second appearance descriptors. The first and second object are assumed to have the same identity if the descriptors are sufficiently similar.

A multi-scale sliding window is applied on the first image 110 and the second image 120 separately. At each location and scale, the image region inside the window is compared with a pre-trained full person model, and a confidence score is calculated. If the score is higher than a given threshold, the window is determined as the full body bounding box of a person. As a result, bounding box 131 is determined as the full body bounding box of person 190. However, bounding box 195 may not be determined correctly because person 133 is partially occluded by person 132, which changes the shape of person 133 inside the image region 195. The change of shape may affect the score and therefore 133 may not be correctly detected.

Even if the first bounding box 131 and the second bounding box 195 are detected and the first person 190 and the second person 133 are known to have the same identity, the appearance descriptors may not be sufficiently similar to correctly match the persons. The persons may not be matched because person 133 is partially occluded by person 132, which changes the appearance of person 133 inside the bounding box 195.

As will be described later, geometric constraints associated with a horizontal vanishing line may be used to determine the full bounding box more accurately, especially when the target object is partially occluded. An example of a horizontal vanishing line is line 168 as shown in FIG. 1A. Knowledge of a target object being occluded can be used to select frames to achieve a greater similarity if the objects in the frames have the same identity.

Figure 1C:
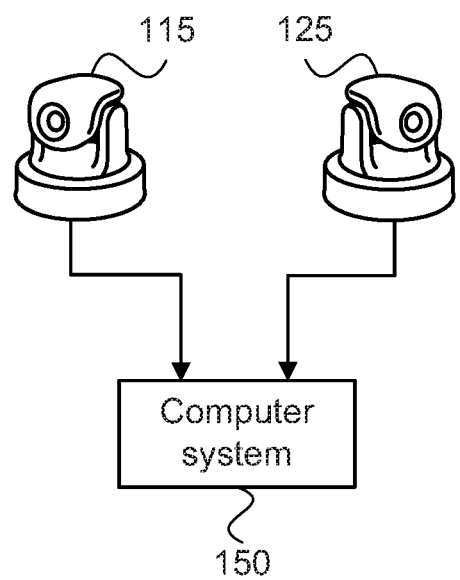
FIG. 1C is a schematic diagram of a surveillance network monitoring an area.

As shown in FIG. 1C, the digital cameras 115 and 125 communicate with a computer system 150. The arrangement of FIG. 1C, implementing the method 400, can be applied to a range of applications. In one example, the computer system 150 may be configured to allow a security guard to select an object of interest through an interactive user interface, and return images of one or more candidate objects determined to be the object of interest. In another example, the computer system 150 may be configured to automatically select an object of interest and match the object across multiple distributed cameras in order to analyse the long-term behaviour of the object.

Figure 6A:
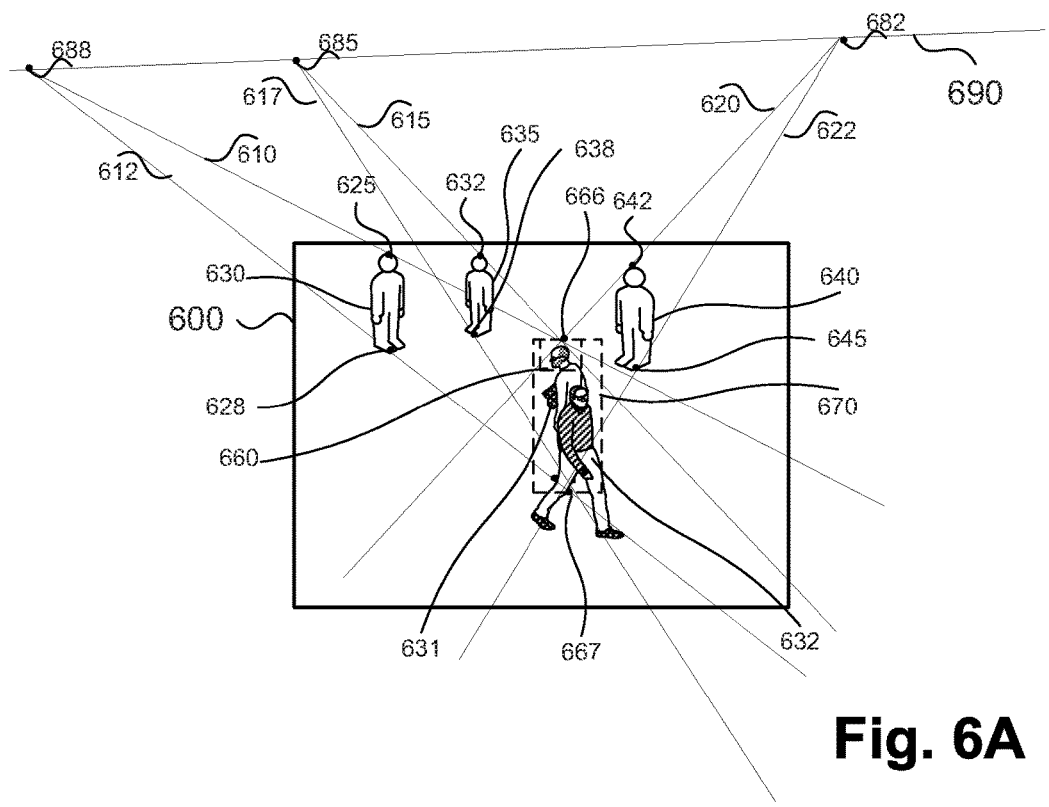
FIGS. 6A and 6B illustrate one example of determining a target full body bounding box in a scene according to one arrangement as in the method of FIG. 5.
Figure 6B:
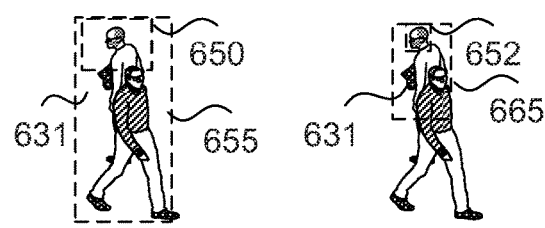

FIG. 6A shows an example of determining a full body bounding box to a target object of interest 631M a camera view, according to one arrangement. Assuming all target objects in the scene are of similar height and moving on a horizontal ground plane, and given a determined head region 660, the full body bounding box 670 is determined based on determined head region 660. The head bounding box may be extended by a fixed pre-learned ratio. However, accuracy of a determined full body bounding box depends much on the accuracy of the determined head bounding box in terms of both location and size. For example, as seen in FIG. 6A, if the size of the head bounding box 650 is too big, a big full body bounding box 655 which includes an area much larger than the target object 631 may result. If the size of the head bounding box 652 is too small, a small full body bounding box 665 which may truncate the person 631 may result.

Where a target object, such as a person, is partially occluded, the target head region is usually visible and less affected by occlusions. A method 500 of determining a target full body bounding box of a target object of interest, will be described below with reference to FIG. 5. The method 500 determines the bounding box from the location of a detected head region by imposing geometric constraints so that the feet bottom (or lowest point) of the target object of interest is correctly determined. Thus, the full body bounding box enclosing the target object is correctly determined using the method 500 even when the feet are occluded and hence not fully visible.

According to one arrangement, a plurality of target objects 630, 635 and 640 with high confidence of being fully visible are selected. The plurality of target objects 630, 635 and 640 are referred to as "reference target objects". A plurality of first lines 610, 615 and 620, also referred to as "head-to-head lines", connecting the head top of target object of interest 666 and head tops of each reference target object 625, 632 and 642 intersect a horizontal vanishing line at a plurality of horizontal vanishing points 688, 685 and 682 are determined. Then, a plurality of second lines 612, 617 and 622, also referred to as "feet-to-feet lines", connecting the vanishing points 688, 685 and 682 and their corresponding reference target feet bottoms 628, 638 and 645 are determined.

The plurality of second lines 612, 617 and 622 should intersect at one single common co-intersection point (i.e. the feet bottom of the target object of interest 631). Since the observed head tops and feet bottoms are measured in the presence of noise, the plurality of second lines typically do not intersect at a single common co-intersection point. In one arrangement, a point is determined by minimizing the sum of distances from the determined point 667 to all the second lines.

Details, examples and alternative implementations for determining a full body bounding box from a head region by imposing geometric constraints are described below.

Figure 2A:
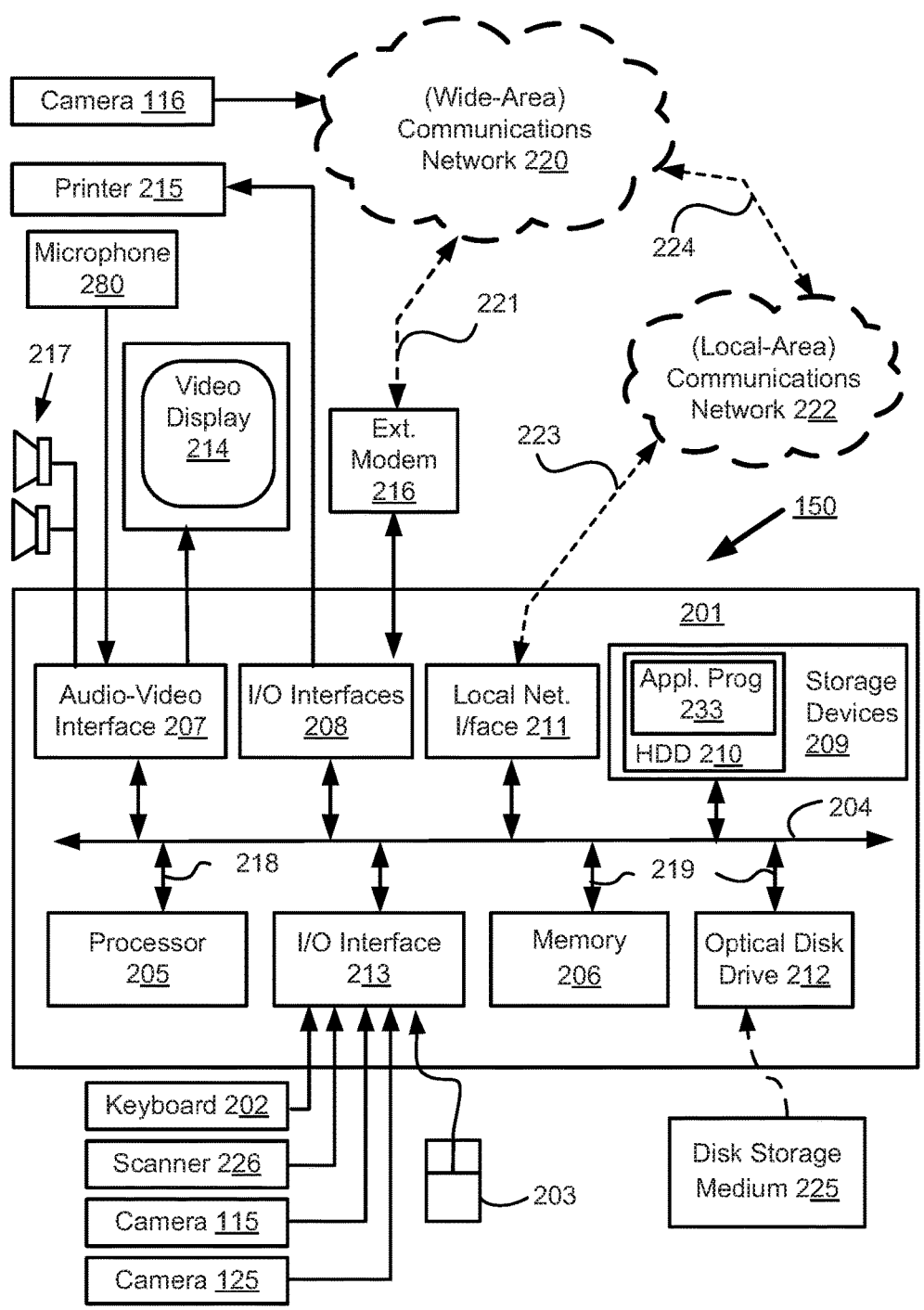
FIGS. 2A and 2B form a schematic block diagram of a general purpose computer system upon which arrangements described can be practiced.
Figure 2B:
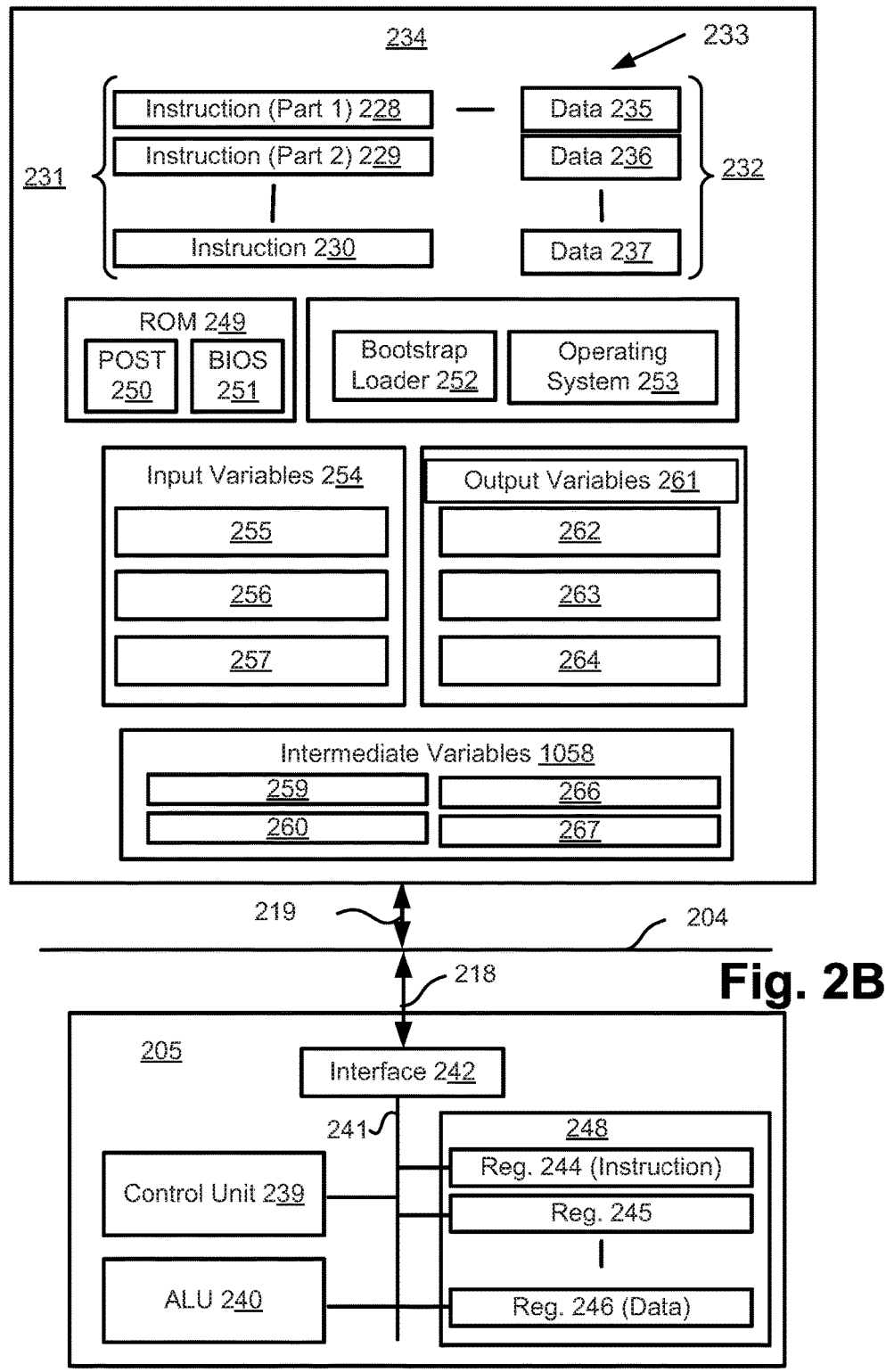

FIGS. 2A and 2B depict a general-purpose computer system 150, upon which the method 400 and method 500 and other described methods can be practiced.

As seen in FIG. 2A, the computer system 150 includes: a computer module 201; input devices such as a keyboard 202, a mouse pointer device 203, a scanner 226, one or more cameras such as the cameras 115 and 125, and a microphone 280; and output devices including a printer 215, a display device 214 and loudspeakers 217. An external Modulator-Demodulator (Modem) transceiver device 216 may be used by the computer module 201 for communicating to and from remote cameras such as 116 over a communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 115 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 150 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-Ray Disc™), USB-RAM, portable, external hard drives, and floppy disks, for example, may be used as appropriate sources of data to the system 150.

The components 205 to 213 of the computer module 201 typically communicate via an interconnected bus 204 and in a manner that results in a conventional mode of operation of the computer system 150 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

The described methods may be implemented using the computer system 150 wherein the processes of FIGS. 4, 5, 7A, 8 and 9, to be described, may be implemented as one or more software application programs 233 executable within the computer system 150. In particular, the steps of the described methods are effected by instructions 231 (see FIG. 2B) in the software 233 that are carried out within the computer system 150. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 150 from the computer readable medium, and then executed by the computer system 150. A computer readable medium having such software or computer program recorded on the computer readable medium is a computer program product. The use of the computer program product in the computer system 150 preferably effects an advantageous apparatus for implementing the described methods.

The software 233 is typically stored in the HDD 210 or the memory 206. The software is loaded into the computer system 150 from a computer readable medium, and executed by the computer system 150. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 150 preferably effects an apparatus for practicing the described arrangements.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 150 from other computer readable media. Computer readable storage media refers to any non-transitory tangible storage medium that provides recorded instructions and/or data to the computer system 150 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 150 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 150 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 150 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed arrangements use input variables 254, which are stored in the memory 234 in corresponding memory locations 255, 256, 257. The described arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:
  a fetch operation, which fetches or reads an instruction 231 from a memory location 228, 229, 230;
  a decode operation in which the control unit 239 determines which instruction has been fetched; and
  an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 7A, 8 and 9 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The described methods may alternatively be implemented in dedicated hardware such as one or more integrated circuits performing the functions or sub functions of the described methods. Such dedicated hardware may include graphic processors, digital signal processors, or one or more microprocessors and associated memories, and may reside on platforms such as video cameras.

The 400 of detecting a target object in an image of a scene, is described below with reference to FIG. 4. The method 400 will be described below by way of example where the target object is a person. The method 400 may be implemented as one or more software code modules of the software application program 233 resident in the hard disk drive 210 and being controlled in its execution by the processor 205. The following description provides details, examples and alternative implementations for the main steps of method 400. Further details, examples and alternative implementations of steps 430, 440 and 450 are described below.

The method 400 starts at receiving step 410, wherein an image from a video sequence is received as input under execution of the processor 205. The received input may be stored within the memory 206, for example, by the processor 205.

Control then passes from step 410 to detecting step 420, where target head detection is performed under execution of the processor 205, to detect target heads in the image received as input in step 410. The set of reference target heads determined at step 420 may be stored within the memory 206, for example, under execution of the processor 205. In one arrangement, a target head is detected at the step 420 by using a supervised machine learning method, such as a head classifier. The head classifier classifies an image region as containing a head or not based on a set of examples images of heads. In another arrangement, a target head is detected based on the omega-shape features of people's head-shoulder parts. In yet another arrangement, a target head is manually detected through a graphical user interface. In one example, a user selects a target head by drawing a rectangle around the object in an image. The output of detection step 420 is a set of bounding boxes enclosing the target heads at different locations in the camera view. Each of the bounding boxes in the set may be referred to as a target head region. The set of bounding boxes determined at step 420 may be stored within the memory 206, under execution of the processor 205.

Control then passes from step 420 to a target full body bounding box determining step 430, where the target full bounding box is determined, under execution of the processor 205, by utilizing a predetermined scene geometry and a set of reference target objects determined in step 440. The predetermined scene geometry and the set of reference target objects determined in step 440 may be stored in the memory 206, for example. In one arrangement, the method 400 may be configured for selecting at least one reference target object in the scene at step 440.

Figure 5:
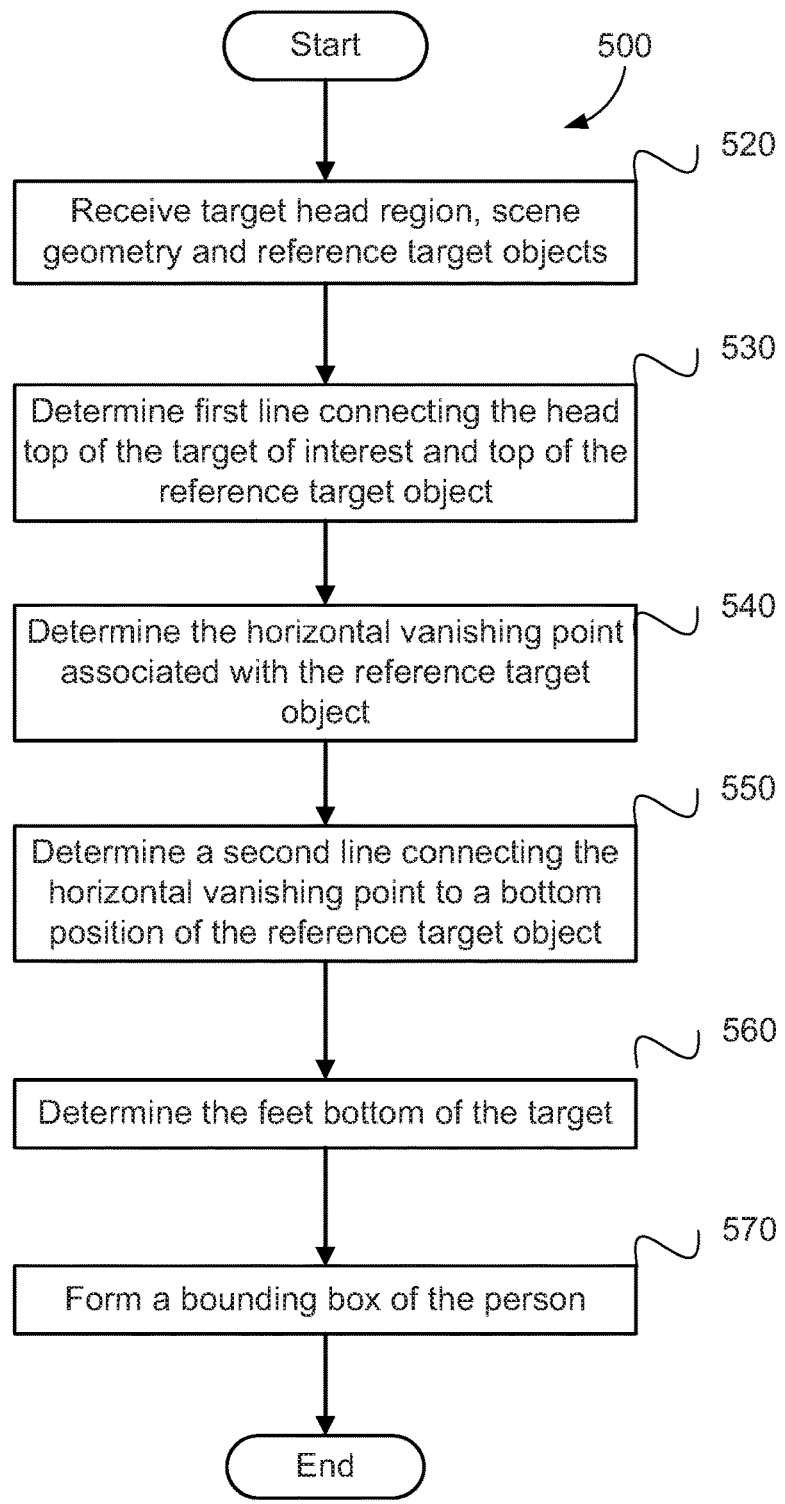
FIG. 5 is a schematic flow diagram showing a method of determining a target full body bounding box as used in the method of FIG. 4.

In one arrangement, the target full bounding box is determined at step 430 by locating the target feet bottom from the target head top and a predetermined horizontal vanishing line, as will be described below with reference to the method 500 in FIG. 5. Details, examples and alternative implementations of the method 500 for determining a full body bounding box, will be described later with reference to FIGS. 6A and 3.

In one arrangement, the scene geometry refers to a horizontal vanishing line. In one arrangement, the horizontal vanishing line and a set of reference target objects are selected. The reference target objects are selected from a set of target objects at different locations in a scene, as will be described later with reference to a method 700 in FIG. 7. In another arrangement, to determine the horizontal vanishing line, a plurality of sets of parallel lines which are parallel to the horizontal plane are detected. The parallel lines in each set determine a horizontal vanishing point. Therefore, the plurality of sets of parallel lines determine a plurality of horizontal vanishing points, which determine a horizontal vanishing line which are collinear with the plurality of horizontal vanishing points. In another arrangement, the scene geometry refers to a horizontal vanishing line and a vertical vanishing point. In one arrangement, the vertical vanishing point is determined by determining the intersection of a plurality of vertical edges in the image. In another arrangement, the vertical vanishing point is determined by finding the intersection of a plurality vertical axes in the image.

The output of the target full body bounding box determining step 430 is a set of full body bounding boxes associated with the determined head bounding boxes in step 420. The bounding boxes determined at step 430 may be stored within the memory 206, for example, under execution of the processor 205.

The method 400 then proceeds from step 430 to bounding box verification step 450, where the target object is detected, under execution of the processor 205, by determining whether the full bounding box encloses a person or not. In one arrangement, at step 450, an occlusion mask for a target object of interest is generated under execution of the processor 205. The occlusion mask defines regions within the target bounding box which are occluded by objects (e.g., other persons) in the scene. Then a feature descriptor is calculated from the region inside the determined bounding box, excluding the occlusion mask. The feature descriptor is provided as input to a part-person classifier, which is generated from a predetermined full body classifier and the occlusion bounding box, to determine whether the determined bounding box encloses a person or not. The output of the bounding box verification step 450 is a subset of target full body bounding boxes. A method 800 of verifying a target bounding box to determine whether the bounding box encloses a target object or not, as executed at step 450 of method 400, will be described below with reference to FIG. 8. The method 400 concludes after completing the vanishing point determining step 450.

The method 500 of determining a target full body bounding box, as executed in at least one arrangement of step 430 of method 400, will now be described with reference to FIG. 5. The method 500 may be implemented as one or more software code modules of the software application program 233 resident in the hard disk drive 210 and being controlled in its execution by the processor 205.

Method 500 starts at retrieving step 520, where a target head region determined at step 420, scene geometry and a set of reference target objects determined at step 440, are received as input under execution of the processor 205. In the example used to describe the method 400, each target head region is associated with a target person. The target head region, scene geometry and reference target objects may be stored in the memory 206, for example, by the processor 205. In one example, shown in FIG. 6A, the method 500 is applied to the object 631 (i.e., a person in the image 600) in the image 600, and at step 510, the head bounding box 660, the horizontal vanishing line 690 and a set of reference target objects 630, 635 and 640 (i.e., other persons in the image 600) are received as input. In another example, shown in FIG. 3, the method 500 is applied to the object 331 (i.e., a person) in the image 300, and at step 510 the head bounding box 360, the horizontal vanishing line 390, a vertical vanishing point 350 and one reference target object 340 (i.e., another person in the image 300) are received as input.

Control then passes from step 520 to a first line determining step 530, where a first line, also referred as a head-head line, connecting the head top (i.e., corresponding to a highest point) of the target object of interest and the head top of a reference target object is determined under execution of the processor 205. The first line determined at step 520 may be stored in the memory 206, under execution of the processor 205. In one arrangement, the head top of a target object is determined at step 530 as the mid-point on the top edge of the determined head bounding box of the target object. One example is shown in FIG. 6A, where the head top of person 631 is determined as the mid-point on the top edge of the head bounding box 660. In another arrangement, the head top of a target object is determined at step 530 as the highest point in a foreground mask associated with the target object. In yet another arrangement, the head top of a target object is determined at step 530 as the highest point on a refined segmented head contour inside determined head bounding box.

Figure 3:
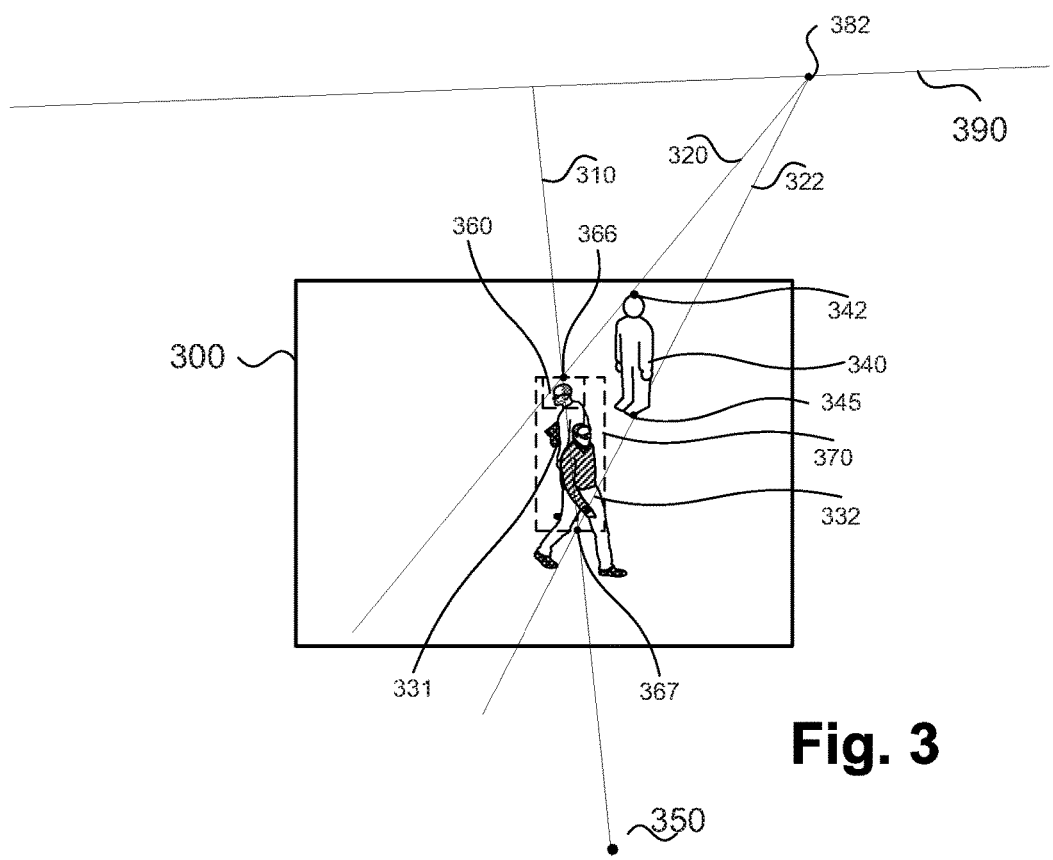
FIG. 3 illustrates one example determining a target full body bounding box in a scene according to one arrangement as in the method of FIG. 5.

As shown in FIG. 6A, a line 610 is determined by connecting the head top 666 of target object 631 and the head top 625 of a reference target object 630. A line 615 is determined by connecting the head top 666 of target object 631 and the head top 632 of a reference target object 635. A line 620 is determined by connecting the head top 666 of target object 631 and the head top 642 of a reference target object 640. Another example is shown in FIG. 3, where a line 320 is determined by connecting the head top 366 of target object 331 and the head top 342 of a reference target object 340.

The method 500 then proceeds from step 530 to the horizontal vanishing point determining step 540, where a horizontal vanishing point, associated with the first line determined in step 530, is determined under execution of the processor 205. In one arrangement, the horizontal vanishing point is determined at step 540 as the intersection of the first line determined in step 530 and the horizontal vanishing line received from step 520. As shown in the example of FIG. 6A, horizontal vanishing point 688 is determined at step 540 as the intersection of the head-to-head line 610 and the horizontal vanishing line 690. In another example, horizontal vanishing point 685 is determined at step 540 as the intersection of the head-to-head line 615 and the horizontal vanishing line 690. In yet another example, horizontal vanishing point 688 is determined at step 540 as the intersection of the head-to-head line 610 and the horizontal vanishing line 690. In still another example, as referred to FIG. 3, horizontal vanishing point 382 is determined at step 540 as the intersection of the head-to-head line 320 and the horizontal vanishing line 390. The horizontal vanishing point determined at step 540 may be stored in the memory 206, for example, under execution of the processor 205.

The method 500 then proceeds from step 540 to a second line determining step 550. At step 550, a second line, which may be referred as a feet-to-feet line, connecting the horizontal vanishing point determined in step 540 and a feet bottom corresponding to a lowest point of a reference target object associated with the horizontal vanishing point is determined under execution of the processor 205. The line determined at step 550 may be stored in the memory 206, for example, under execution of the processor 205. In one arrangement, the feet bottom of a target object is determined as the mid-point on the bottom edge of the bounding box of the target object. In another arrangement, the feet bottom of a target object is determined at step 540 as the lowest point in a foreground mask associated with the target object. For example, as shown FIG. 6A, the feet bottom 628 of the target object 630 is determined as the lowest point in a foreground mask of target object 630. In yet another arrangement, the feet bottom of a target object is determined as the mid-point on the bottom edge of the feet bounding box of the target object. For example, as shown in FIG. 6A, a line 612 is determined by connecting the horizontal vanishing point 688 associated with a reference target object 630 and the feet bottom 628 of a reference target object 630. A line 617 is determined by connecting the horizontal vanishing point 685 associated with a reference target object 635 and the feet bottom 638 of the reference target object 635. A line 622 is determined by the horizontal vanishing point 682 associated with a reference target object 640 and the feet bottom 645 of the reference target object 640. Another example is shown in FIG. 3, where a line 322 is determined by the horizontal vanishing point 382 associated with a reference target object 340 and the feet bottom 345 of the reference target object 340.

The method 500 then proceeds from step 550 to the target feet bottom determining step 560, where the feet bottom of the target object is determined under execution of the processor 205. The feet bottom of the target object as determined at step 560 may be stored in the memory 206, for example, under execution of the processor 205.

The target feet bottom is determined at step 560 based on the second line determined at step 550. The position of the feet bottom (i.e., corresponding to the lowest point) of the target object may be determined at step 550 based on an intersection of the second line determined at step 550 and a vertical vanishing point. In one arrangement, the position of the feet bottom of the target object may be determined at step 550 based on an intersection of a second line (i.e., as determined at step 550) of a first reference target object and a second line of a second reference target object. In another arrangement, the position of the feet bottom is determined based on said intersection and a plurality of reference objects.

As an example, the feet bottom may be determined at step 550 by finding a point minimizing the sum of its distance to all the feet-to-feet lines determined in step 550. Supposing there are N (N≥2) reference target objects. For each reference target object i (i=1, 2, . . . , N), the feet-to-feet associated with target i is denoted as $l_i$. The feet bottom of the target object of interest, denoted as $p_f$ is estimated as a point p which minimizes sum of its distances to all the lines, as given in Equation (1), below. In one arrangement, the point minimizing the cost function in Equation (1) is solved by a linear least squares algorithm.

$$p_f = \arg\min_p \sum_i^N d(p, l_i) \quad (1)$$

One example is shown in FIG. 6A, where the feet bottom 667 of target object 631 is determined as a point which minimizes sum of its distances to line 612, line 617 and line 622. In another arrangement, a feet bottom is determined at step 550 by finding a point minimizing the sum of its distance to all the feet-to-feet lines determined in step 550, and a vertical axis of the target of interest. In one arrangement, the vertical axis is determined by connecting the head top of the target and a vertical vanishing point. One example is shown in FIG. 3, where the vertical axis 310 of the target object 331 is determined by connecting the head top 366 and the vertical vanishing point 350. Supposing there are N (N≥1) reference target objects. For each reference target object i (i=1, 2, . . . , N), the feet-to-feet associated with target object i is denoted as I. A vertical axis of a target object of interest is denoted as $l_v$. The feet bottom of the target object of interest, denoted as $p_f$ is estimated as a point p which minimizes sum of its distances to all the feet-to-feet lines $l_i$ and the vertical axis $l_v$, as given in Equation (2) below.

In one arrangement, the point minimizing the cost function in Equation (2) is solved by a linear least squares algorithm.

$$p_f = \arg\min_p \sum_i^N d(p, l_i) + d(p, l_v) \quad (2)$$

One example is shown in FIG. 3, where the feet bottom 367 of target object 331 is determined as the intersection of line 322 and the vertical axis 310 of target object 331.

The method 500 then proceeds from step 560 to a bounding box forming step 570. At step 570, a bounding box for the target object is formed from the head top determined in step 530 and the feet bottom determined in step 560. In the example used here to describe the method 400, the bounding box formed at step 560 is used to detect the target person. The bounding box may be formed at step 570 based on the head region of the target person and the feet bottom (i.e., lowest point) of the target person as determined at step 560. In one arrangement, the bounding box is determined at step 570 based on a predetermined aspect ratio. Denoting the head top location as $(x_h, y_h)$ and the feet bottom as $(x_f, y_f)$, and a pre-determined aspect ratio α (for example α=3), the center c, height h and width w of the determined bounding box is calculated by Equation (3) as follows:

$$c = \left[\frac{x_h + x_f}{2}, \frac{y_h + y_f}{2}\right] \quad (3)$$
$$h = |y_f - y_h|$$
$$w = h/\alpha$$

Method 500 concludes after completing the bounding box determining step 570. The bounding box determined at step 570 may be stored, for example, in the memory 206 under execution of the processor 205.

Figure 7:
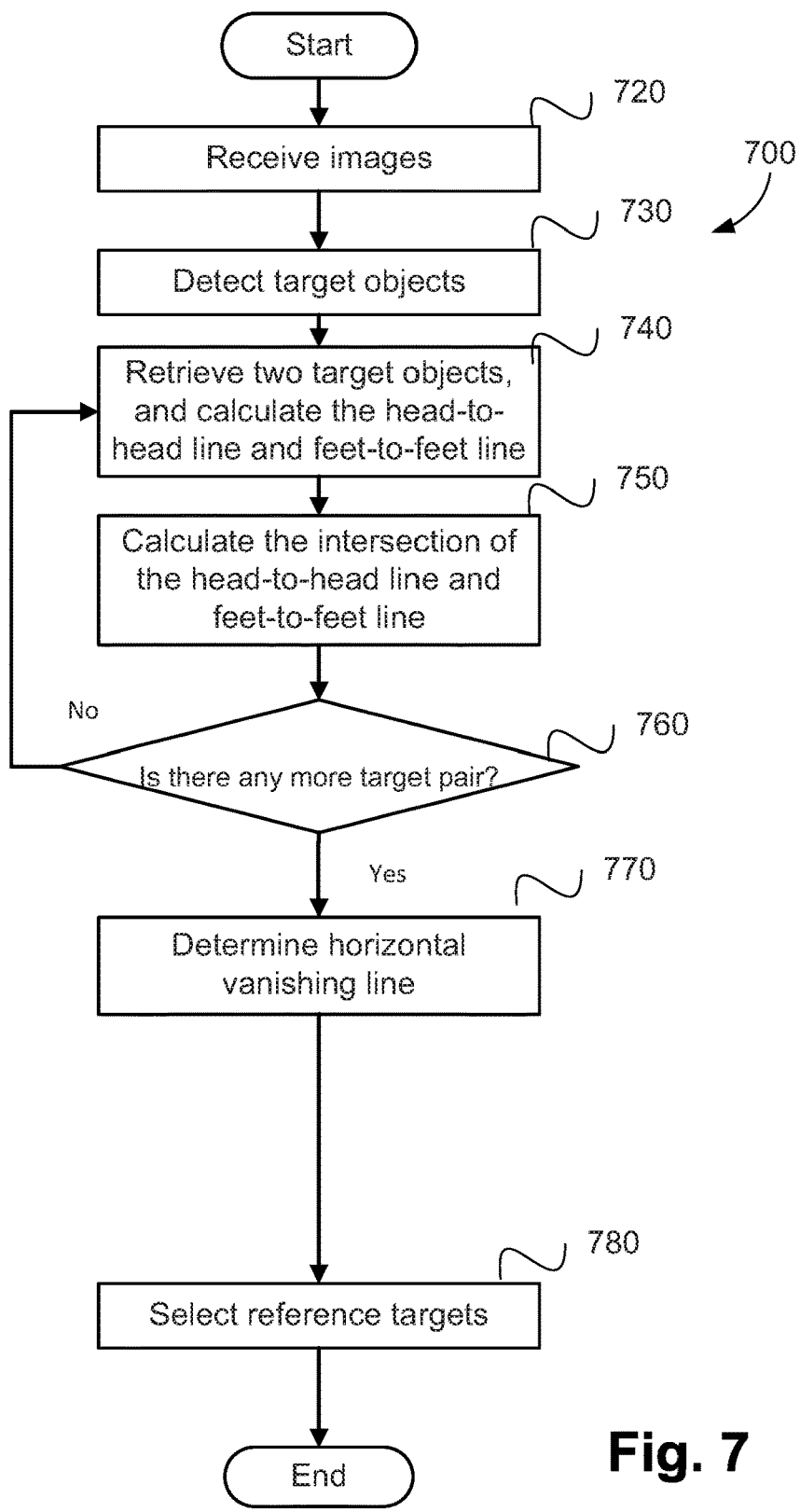
FIG. 7 is a schematic flow diagram showing a method of selecting reference target objects, as used in the method of FIG. 4.

A method 700 of selecting a set of reference target objects, as executed in at least one arrangement of step 440 of method 400, will now be described with reference to FIG. 7. The method 700 also determines a horizontal vanishing point.

The method 700 may be implemented as one or more software code modules of the software application program 233 resident in the hard disk drive 210 and being controlled in its execution by the processor 205.

Method 700 starts at the retrieving step 710, where images captured from a camera (e.g., camera 115) are received as input. In one arrangement, an image with a plurality of target objects is received. In another arrangement, a video sequence of a moving target object is received.

Control then passes from step 720 to a target detecting step 730, where target objects are detected in each image of the video sequence received as input in step 720. The detected target objects may be stored in the memory 206, under execution of the processor 205. In one arrangement, a target object is detected at the step 730 by performing foreground separation using a statistical background pixel modelling method such as Mixture of Gaussian (MoG), where the background model is maintained over multiple frames with a static camera (e.g., camera 115). In another arrangement, at step 730, a foreground separation method is performed on Discrete Cosine Transform blocks. In yet another arrangement, at step 730, a foreground separation is performed on an unsupervised segmentation of the image, for example, using superpixels. In yet another arrangement, the target objects are detected at step 730 using a supervised machine learning method, such as an object detector. An object detector may be used to classify an image region as containing a known type of object or not based on a set of example images of the known type of object.

In still yet another arrangement, at least one target object is manually detected at step 730 through a graphical user interface. For example, a user may select a target object by drawing a rectangle around the object in an image. The output of detection step 730 is a set of bounding boxes for the moving object at different locations in the camera view. The set of bounding boxes determined at step 730 may be stored within the memory 206, under execution of the processor 205.

The method 700 then proceeds from step 730 to target pair retrieving step 740, where two target objects from the target objects determined at step 730 are retrieved under execution of the processor 205. In one arrangement, the two target objects are selected at step 730 as two target objects with different identities from a single image. In another arrangement, the two target objects are selected at step 730 as two target objects with the same identity from two different image frames. In yet another arrangement, the two target objects are selected at step 730 as two target objects with different identities from two different image frames.

A head-to-head line is calculated at step 740 by connecting the head tops of the two selected target objects. A feet-to-feet line is calculated by connecting the feet bottoms of the two selected target objects. Assuming the height of all target objects stays roughly the same over the observations, the two lines are parallel to each other in the scene and their images are collinear with the horizontal vanishing line. The head-to-head line and the feet-to-feet line are stored in the memory 206, under execution of the processor 205.

The method 700 then proceeds from step 740 to an intersection determining step 750, where the intersection of the head-to-head line and feet-to-feet line determined at step 740 is determined under execution of the processor 205. In one arrangement, the intersection of the head-to-head line and feet-to-feet lines is determined at step 750 in the homogeneous space as $P_j = l_h^j \times l_f^j$. The intersection represents a vanishing point which lies on the horizon line to be determined. The intersection determined at step 750 may be stored in the memory 206, for example, under execution of the processor 205.

The method 700 then proceeds from step 750 to a target pair checking step 760, where if all the pairs of target objects have been processed, then the method 700 proceeds to step 770. Otherwise, the method 700 returns to step 740 where a new pair of target objects is retrieved.

After processing all the pairs of target objects, the method 700 then proceeds to a horizontal vanishing line determining step 770 where the horizontal vanishing line in the image coordinates system is determined by linking and fitting a line to the entire set of vanishing points $\{p_j = (x_j, y_j, 1)\}$ obtained. Letting the horizontal line in the image coordinate system be $l_h = (a_h, b_h, c_h)^T$, the line fitting process performed at step 770 is given by Equation (4), as follows:

$$l_h = \operatorname{argmin}_l \sum_j p_j^T l \qquad (4)$$

In one arrangement, the line fitting is implemented at step 770 using the robust data fitting algorithm RANSAC. The RANSAC algorithm is able to reject possible outliers in the determined vanishing point set, and fitting a line using only those inliers which pass a confidence test. In another arrangement, the Maximum Likelihood Estimation (MLE) is used at step 770 to perform the line fitting. In yet another arrangement, the Nonlinear Mean Square Estimation (NMSE) algorithm is used. The horizontal vanishing line determined at step 770 may be stored in the memory 206 under execution of the processor 205.

Control then passes from step 770 to a reference target selecting step 780, where, under execution of the processor 205, a set of reference target objects are selected from all the detected target objects determined at step 720. In one arrangement, the reference target objects are selected based on distances from their associated intersections determined at step 750 to the determined horizontal vanishing line determined at step 770. For each target object detected at step 730, the number of intersections associated with the target object, is denoted as n. The number of the intersections whose distance to the horizontal vanishing line is less than a predefined threshold (e.g., thirty (30) pixels) is denoted as m, (m<n). The ratio m/n can be determined. If the ratio is greater than a pre-defined threshold (e.g., 0.8), the target is selected as a reference target object. Method 700 concludes after completing step 780. The set of reference target objects selected at step 780 may be stored in the memory 206, for example, under execution of the processor 205.

Figure 8:
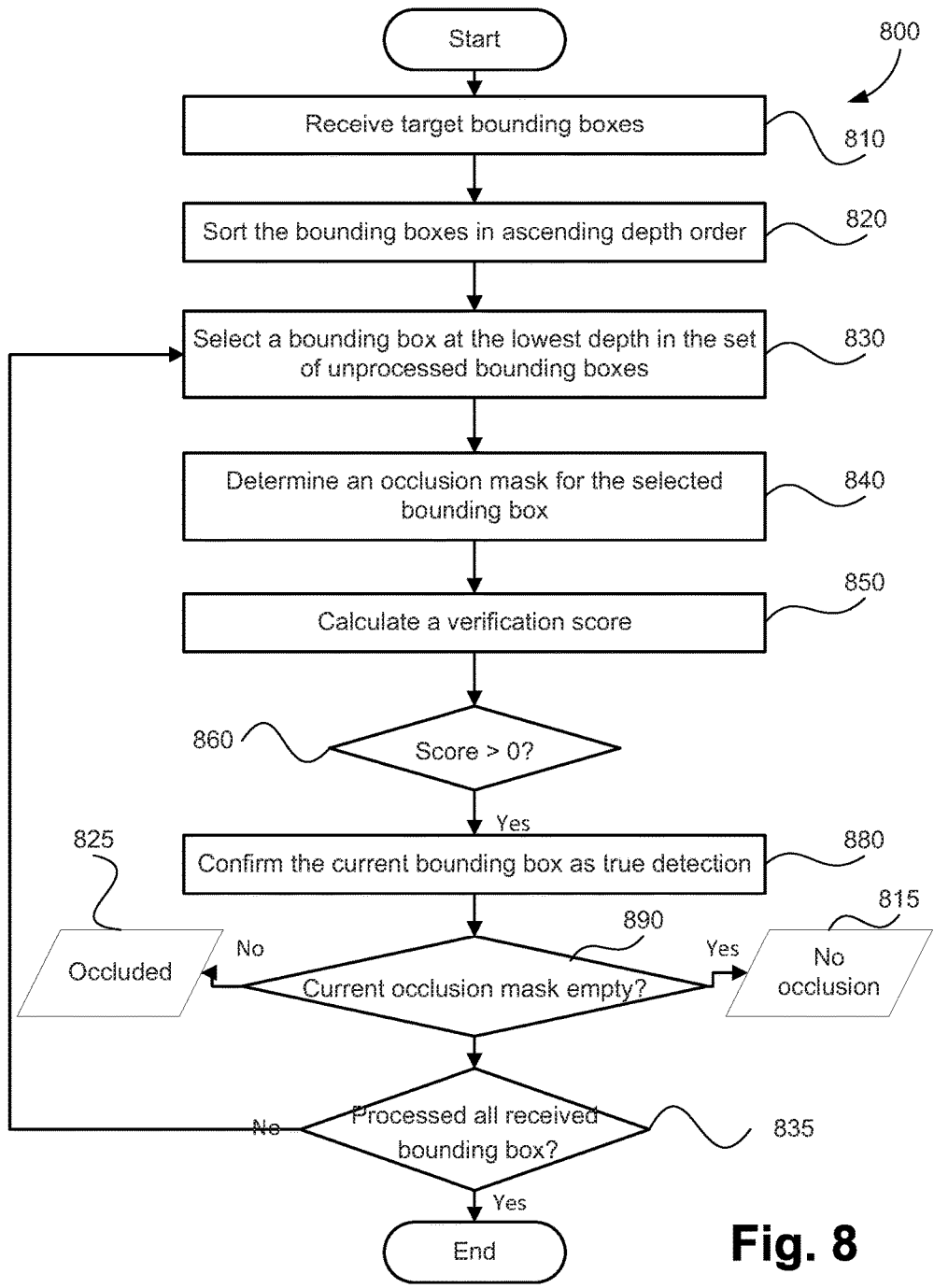
FIG. 8 is a schematic flow diagram showing a method of verifying a target bounding box as used in the method of FIG. 4.

The method 800 of verifying a target bounding box, as executed in at least one arrangement of step 450 of method 400, will now be described with reference to FIG. 8. The method 800 uses an associated part-based model to determine whether a bounding box encloses a target object or not.

The method 800 may be implemented as one or more software code modules of the software application program 233 resident in the hard disk drive 210 and being controlled in its execution by the processor 205.

Method 800 starts at the retrieving step 810, where target bounding boxes determined at step 430 are received from memory 206, for example, under execution of the processor 205.

Control then passes from step 810 to a sorting step 820, where the received bounding boxes are sorted in ascending order according to the depth ordering associated with each of the bounding boxes. In one arrangement, the depth ordering is determined based on the y-coordinate of the top of the bounding box in the image plane. A smaller y value corresponds to a lower depth order. A bigger y value corresponds to a higher depth order.

The method 800 then proceeds from step 820 to a selecting step 830, a bounding box with the lowest depth order in a set of unprocessed bounding boxes is selected under execution of the processor 205. In one arrangement, the set of unprocessed bounding boxes is initially set to include all the bounding boxes received at step 810. After a bounding box is processed in the method 800, the processed bounding box will be removed from the set of unprocessed bounding boxes. The size of the set of unprocessed bounding boxes is reduced until all the bounding boxes are processed.

Figure 10:
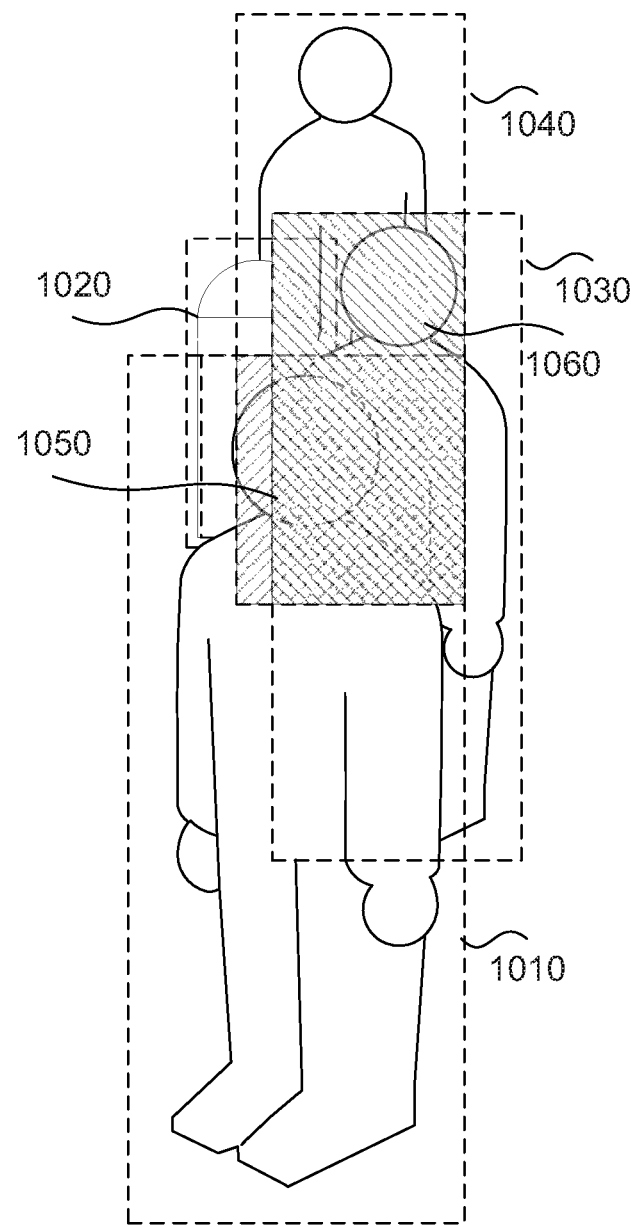
FIG. 10 shows an example of a number of bounding boxes which may be used in determining an occlusion mask according to one arrangement in the method of FIG. 8.

The method 800 then proceeds from step 830 to an occlusion mask determining step 840, where an occlusion mask is determined for the selected bounding box determined at step 830. In one arrangement, the occlusion mask is defined as regions within the target bounding box which are occluded by other persons or other types of objects in the scene. The occlusion mask is determined at step 830 as the intersection of the selected bounding box with all the confirmed bounding boxes. For example, as shown in FIG. 10, a selected bounding box is bounding box 1040. Three bounding boxes 1010, 1020, and 1030 have lower depth order than the selected bounding box 1040. However, only bounding boxes 1010 and 1030 have been confirmed as true detections at step 880, as will be described below. The region in the selected bounding box 1040 that intersects with all the confirmed bounding boxes 1010 and 1030 (shown with shaded patterns, denoted as 1050 and 1060) is determined as the occlusion mask for the selected bounding box 1040. The occlusion mask determined at step 840 may be stored, for example, under execution of the processor 205.

The method 800 then proceeds from step 840 to a verification score calculating step 850, where a score is calculated to verify whether the bounding box selected at step 830 encloses a target object. If the bounding box selected at step 830 encloses a target object, then the bounding box is referred to as a true detection. If the bounding box selected at step 830 does not enclose a target object, then the bounding box is referred to as a false positive. In one arrangement, the score is calculated at step 850 based on a modified person model. The modified person model may comprise a set of positive training samples, where each sample is an image of a fully visible person, and a set of negative training samples, where each sample is an image of anything other than a fully visible person. A supervised machine learning method, such as Support Vector Machine, may be applied to generate a holistic person classifier. The score may be determined at step 850 using Equation (5), below:

$$f(x) = w^T x + \beta \quad (5)$$

where x is a feature descriptor (e.g., Histogram of Oriented Gradients, abbreviated as HOG) of a sample image, w is the trained weighting vector (also called filter), and β is the bias (scalar) term. Given a new sample image with a feature descriptor x, a score is calculated at step 850 according to Equation (5). If the score determined at step 850 is positive, then the selected bounding box is labelled as a person. Otherwise, the selected bounding box will be labelled as non-person.

When the target object is occluded, the shape and texture (described by feature descriptor) will get corrupted by the occluder. Therefore, a part model which matches the visible part of the target object is used to verify whether the occluded target object is a person. To deal with partial occlusion, the holistic person classifier is converted into a block-level classifier. The holistic filter w and the holistic bias β are divided into blocks, where each block is a rectangular region inside the image. One example of a block is an 8×8 pixel region. Mathematically, the holistic classifier f(x) is reformulated as a summation of a set of block-level classifier $f_i(\tilde{x}_i)$, as given in Equation (6), below, where $\tilde{w}_i$ is the filter for the i-th block, and is the re-distributed bias for the i-th block; $\tilde{x}_i$ is the HOG feature in the i-th block, and B is the total number of blocks.

$$f(x) = w^T x + \beta = \sum_{i=1}^{B} \tilde{w}_i^T \tilde{x}_i + \tilde{\beta}_i = \sum_{i}^{B} f_i(\tilde{x}_i) \quad (6)$$

Denoting the occlusion mask determined at step 840 as M, the verification score is calculated only using the blocks that are not in the determined occlusion mask in the bounding box region, as given in Equation (7), below:

$$f(x) = \sum_{i \notin M} \tilde{w}_i^T \tilde{x}_i + \tilde{\beta}_i \quad (7)$$

The verification score calculated at step 850 may be stored in the memory 206, for example, under execution of the processor 205.

The method 800 then proceeds from step 850 to a score checking step 860, where if the score calculated at step 850 is greater than a threshold (e.g., the threshold is set to 0), then the method 800 moves on to the next step 880. Otherwise, if the score calculated at step 850 is not greater than the threshold, then the bounding box is determined as a false positive detection.

At confirming step 880, the bounding box selected at step 830 is confirmed as a true detection. The bounding boxes labelled as a true detection may be stored, for example, in the memory 206 under execution of the processor 205.

The method 800 then proceeds from step 880 to an occlusion mask checking step 890, which checks whether the occlusion mask determined at step 840 is empty. If the occlusion mask determined at step 840 is not empty, then the method 800 proceeds to step 825 where the bounding box is labelled as occluded. Otherwise, if the occlusion mask determined at step 840 is empty, then the method 800 proceeds to step 815 where the bounding box selected at step 830 is labelled as unoccluded. The labelled bounding boxes may be stored in the memory 206, under execution of the processor 205.

The method 800 then proceeds from step 890 to a target pair checking step 835, where is all bounding boxes received at step 810 have been processed, then the method 800 concludes. Otherwise, the method 800 returns to step 830 where a new bounding is selected.

As shown in the example of FIGS. 1A and 1B, the arrangements described in the present description can be applied to the problem of re-identifying a target object in a surveillance camera network. Knowledge of whether the target object is occluded and which part is occluded can be used to improve the appearance feature descriptor for the target object. In one example, the "un-occluded" images of a target object may be used to calculate an appearance feature descriptor. In one arrangement, each target object is labelled as "un-occluded" or "occluded", according to the method 400 and the method 800. Given a track of a target object from a video sequence, appearance descriptors are then accumulated over the "un-occluded" images from the video sequence. Two appearance descriptors are calculated for two tracks of target objects from two cameras and are then compared in order to determine whether the target objects have the same identity.

Figure 9:
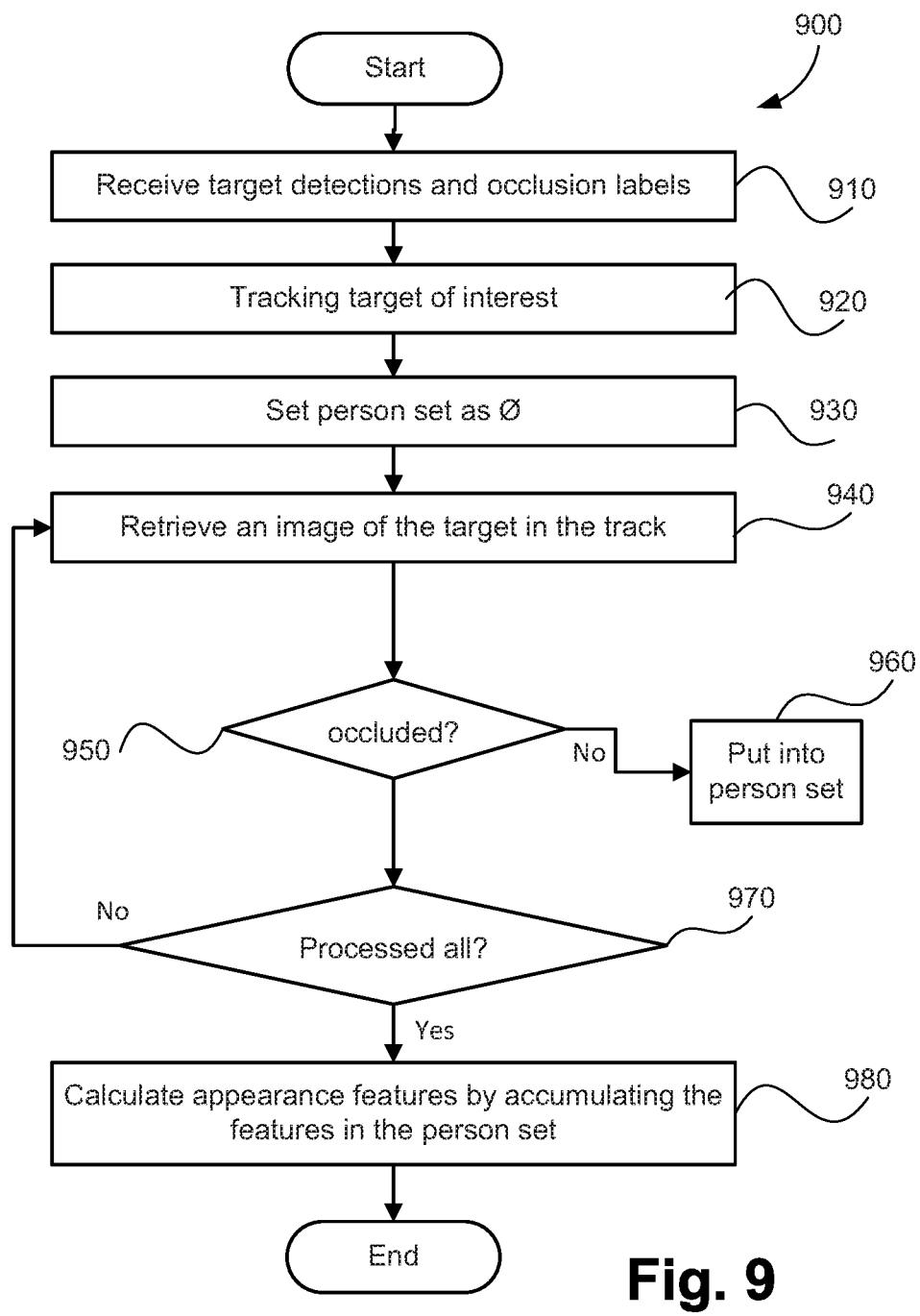
FIG. 9 is a schematic flow diagram showing a method of determining an appearance feature descriptor.

A method 900 of determining an appearance feature descriptor, as utilised in the applications described above, will now be described with reference to FIG. 9. The method 900 may be implemented as one or more software code modules of the software application program 233 resident in the hard disk drive 210 and being controlled in its execution by the processor 205.

The method 900 starts at the retrieving step 910, where the detected bounding boxes of target objects in a sequence of images, and their occlusion labels, as determined in accordance with the methods 400 and 800, are received as input under execution of the processor 205. The detected bounding boxes of target objects and their occlusion labels may be stored in the memory 206 by the processor 206.

The method 900 then proceeds from step 910 to tracking step 920, where a target object of interest in the video sequence is tracked under execution of the processor 205. In one arrangement of step 920, naïve tracking is performed by assuming Brownian motion and associating a detected object in one frame of the video sequence to the detected object at a nearest image location in a previous frame of the video sequence. In another arrangement, tracking is performed at step 920 by estimating the motion of the target object of interest using a recursive Bayesian filter such as a Kalman filter or particle filter. In still another arrangement, tracking is performed at step 920 using appearance information about the target object of interest in addition to positional and velocity information. A track associated with the target object of interest in the video sequence, as determined at step 920, may be stored in the memory 206, under execution of the processor 205.

The method 900 then proceeds from step 920 to an initial setup step 930, where a person set is formed, and set as an empty set Φ under execution of the processor 205. The person set formed at step 930 may be stored in the memory 206, for example, under execution of the processor 205.

The method 900 then proceeds from step 930 to an image retrieving step 940, where an image of the target object of interest. An occlusion label associated with the target object of interest is also retrieved in the track determined at step 920.

The method 900 then proceeds from step 940 to a label checking step 950, where if the target object of interest in the image is not occluded, then the process goes to step 960 where the image is stored into the person set configured within the memory 206. Otherwise, if the target object of interest in the image is determined to be occluded at step 950, then the method 900 proceeds to a track checking step 970.

At track checking step 970, if all the images of the target object of interest in the track have been processed, then the method 900 proceeds to descriptor calculating step 980. Otherwise, if not all the images of the target object of interest in the track have been processed, then the method 900 returns to step 940 where a new image of the target object of interest is retrieved.

At the descriptor calculating step 980, the appearance feature descriptor is calculated over all the "un-occluded" images in the person set under execution of the processor 205. The calculated appearance feature descriptor may be stored in the memory 206, for example, under execution of the processor 205. In one arrangement of step 980, the feature descriptor is calculated at step 980 by accumulating histograms over all images in the person set, and histograms are normalized to a canonical size.

The method 900 concludes after completing the feature calculating step 980.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method executed by one or more processors that determines a lowest point of a target object in an image of a scene captured by a camera, said method comprising:
   receiving a region of the target object in the image captured by the camera;
   receiving a horizontal vanishing line of the image captured by the camera;
   selecting, within the image captured by the camera, at least one reference object in the scene;
   determining, within the image captured by the camera, at least a first line connecting the received region of the target object and a highest point of the reference object;
   determining, within the image captured by the camera, at least an intersection point of the first line and the horizontal vanishing line;
   determining, within the image captured by the camera, at least a second line connecting the determined intersection point to a lowest point of the reference object; and
   determining a lowest point of the target object within the image captured by the camera based on the second line.

2. The method according to claim 1, further comprising forming, within the image captured by the camera, a bounding box of the target object, the bounding box being based on the received region and the lowest point of the target object.

3. The method according to claim 1, further comprising detecting, within the image captured by the camera, the target object based on the bounding box.

4. The method according to claim 1, further comprising determining, within the image captured by the camera, a position of feet of the target object based on the intersection of the second line and a vertical vanishing point.

5. The method according to claim 1, wherein the lowest point of the target object within the image captured by the camera is further based on an intersection of a second line of a first reference target object and a second line of a second reference target object.

6. The method according to claim 1, wherein the lowest point within the image captured by the camera is determined based on said intersection and a plurality of reference objects.

7. The method according to claim 1, wherein the lowest point of the target object within the image captured by the camera is determined based on a lowest point in a foreground mask associated with the target object.

8. The method according to claim 2, further comprising verifying the bounding box formed within the image captured by the camera based on a person model.

9. The method according to claim 1, wherein the reference objects and target objects within the image captured by the camera are selected based on distances from associated intersections to a determined line.

10. The method according to claim 2, further comprising verifying the bounding box formed within the image is enclosing the target object.

11. The method according to claim 2, further comprising determining an occlusion mask for the bounding box formed within the image captured by the camera.

12. The method according to claim 1, wherein the target object is a person.

13. The method according to claim 1, wherein the received region is a head region.

14. A system for determining a lowest point of a target object in an image of a scene captured by a camera, said system comprising:
- a memory for storing data and a computer program;
- a processor coupled to the memory for executing the computer program, said computer program comprising instructions for:
    - receiving a region of the target object in the image captured by the camera;
    - receiving a horizontal vanishing line of the image captured by the camera;
    - selecting, within the image captured by the camera, at least one reference object in the scene;
    - determining, within the image captured by the camera, at least a first line connecting the received region of the target object and a highest point of the reference object;
    - determining, within the image captured by the camera, at least an intersection point of the first line and the horizontal vanishing line;
    - determining, within the image captured by the camera, at least a second line connecting the determined intersection point to a lowest point of the reference object; and
    - determining a lowest point of the target object within the image captured by the camera based on the second line.

15. An apparatus for determining a lowest point of a target object in an image of a scene captured by a camera, said apparatus comprising:
- units for receiving a region of the target object in the image captured by the camera;
- units for receiving a horizontal vanishing line of the image captured by the camera;
- units for selecting, within the image captured by the camera, at least one reference object in the scene;
- units for determining, within the image captured by the camera, at least a first line connecting the received region of the target object and a highest point of the reference object;
- units for determining at least an intersection point of the first line and the horizontal vanishing line;
- units for determining, within the image captured by the camera, at least a second line connecting the determined intersection point to a lowest point of the reference object; and
- units for determining a lowest point of the target object within the image captured by the camera based on the second line.

16. A non-transitory computer readable medium having a computer program stored on the medium that, when executed by one or more processors, determines a lowest point of a target object in an image of a scene captured by a camera, said program comprising:
- code for receiving a region of the target object in the image captured by the camera;
- code for receiving a horizontal vanishing line of the image captured by the camera;
- code for selecting, within the image captured by the camera, at least one reference object in the scene;
- code for determining, within the image captured by the camera, at least a first line connecting the received region of the target object and a highest point of the reference object;
- code for determining, within the image captured by the camera, at least an intersection point of the first line and the horizontal vanishing line;
- code for determining, within the image captured by the camera, at least a second line connecting the determined intersection point to a lowest point of the reference object; and
- code for determining a lowest point of the target object within the image captured by the camera based on the second line.

17. A method, executed by one or more processors, that detects a target object in an image of a scene captured by a camera, said method comprising:
- receiving a head region of the target object in the image captured by the camera;
- receiving a horizontal vanishing line of the image captured by the camera;
- selecting, within the image captured by the camera, at least a reference object in the scene;
- determining, within the image captured by the camera, at least a first line connecting the head region and a top of the reference object;
- determining, within the image captured by the camera, at least an intersection of the first line and the horizontal vanishing line;
- determining, within the image captured by the camera, at least a second line connecting the intersection to a bottom position of the reference object;
- determining lowest point of the target object within the image captured by the camera based on the second line; and
- forming, within the image captured by the camera, a bounding box of the target object to detect the target object, the bounding box being based on the head region and the point of the target person.

18. A system for detecting a target object in an image of a scene captured by a camera, said system comprising:
- a memory for storing data and a computer program;
- a processor coupled to the memory for executing the computer program, said computer program comprising instructions for:
    - receiving a head region of the target object in the image captured by the camera;
    - receiving a horizontal vanishing line of the image captured by the camera;
    - selecting, within the image captured by the camera, at least a reference object in the scene;
    - determining, within the image captured by the camera, at least a first line connecting the head region and a top of the reference object;
    - determining, within the image captured by the camera, at least an intersection of the first line and the horizontal vanishing line;
    - determining, within the image captured by the camera, at least a second line connecting the intersection to a bottom position of the reference object;
    - determining lowest point of the target object within the image captured by the camera based on the second line; and
    - forming, within the image captured by the camera, a bounding box of the target object to detect the target object, the bounding box being based on the head region and the point of the target person.

19. An apparatus for detecting a target object in an image of a scene captured by a camera, said apparatus comprising:
- units for receiving a head region of the target object in the image captured by the camera;
- units for receiving a horizontal vanishing line of the image captured by the camera;
- units for selecting, within the image captured by the camera, at least a reference object in the scene;
- units for determining, within the image captured by the camera, at least a first line connecting the head region and a top of the reference object;
- units for determining, within the image captured by the camera, at least an intersection of the first line and the horizontal vanishing line;
- units for determining, within the image captured by the camera, at least a second line connecting the intersection to a bottom position of the reference object;
- units for determining lowest point of the target object within the image captured by the camera based on the second line; and
- units for forming, within the image captured by the camera, a bounding box of the target object to detect the target object, the bounding box being based on the head region and the point of the target person.

20. A non-transitory computer readable medium having a computer program stored on the medium that when executed by one or more processors, detects a target object in an image of a scene captured by a camera, said program comprising:
- code for receiving a head region of the target object in the image captured by the camera;
- code for receiving a horizontal vanishing line of the image captured by the camera;
- code for selecting, within the image captured by the camera, at least a reference object in the scene;
- code for determining, within the image captured by the camera, at least a first line connecting the head region and a top of the reference object;
- code for determining, within the image captured by the camera, at least an intersection of the first line and the horizontal vanishing line;
- code for determining, within the image captured by the camera, at least a second line connecting the intersection to a bottom position of the reference object;
- code for determining lowest point of the target object within the image captured by the camera based on the second line; and
- code for forming, within the image captured by the camera, a bounding box of the target object to detect the target object, the bounding box being based on the head region and the point of the target person.

* * * * *